March 4, 1930.  P. C. FIGUERAS  1,749,277
PLOW
Filed March 17, 1928   2 Sheets-Sheet 2
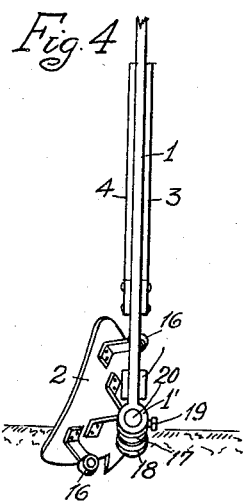
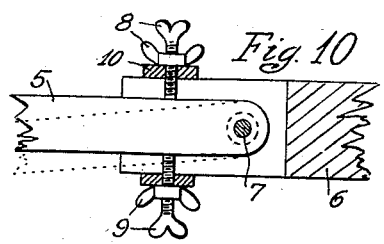
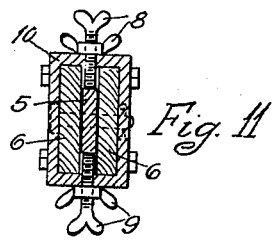
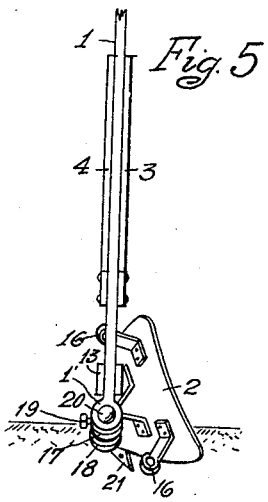
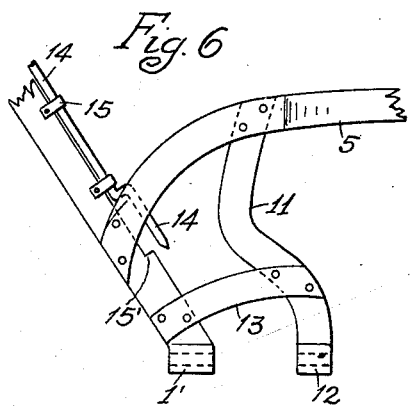
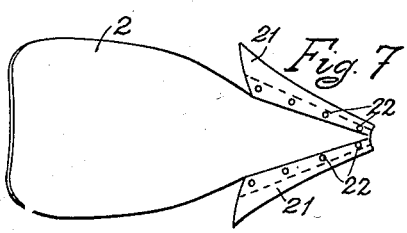
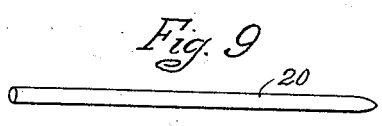
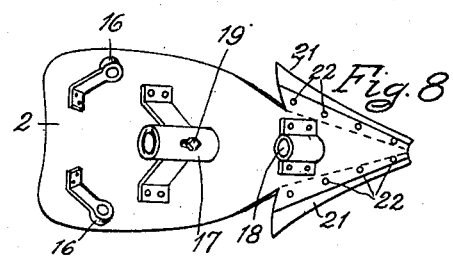
INVENTOR
P. C. FIGUERAS Patented Mar. 4, 1930

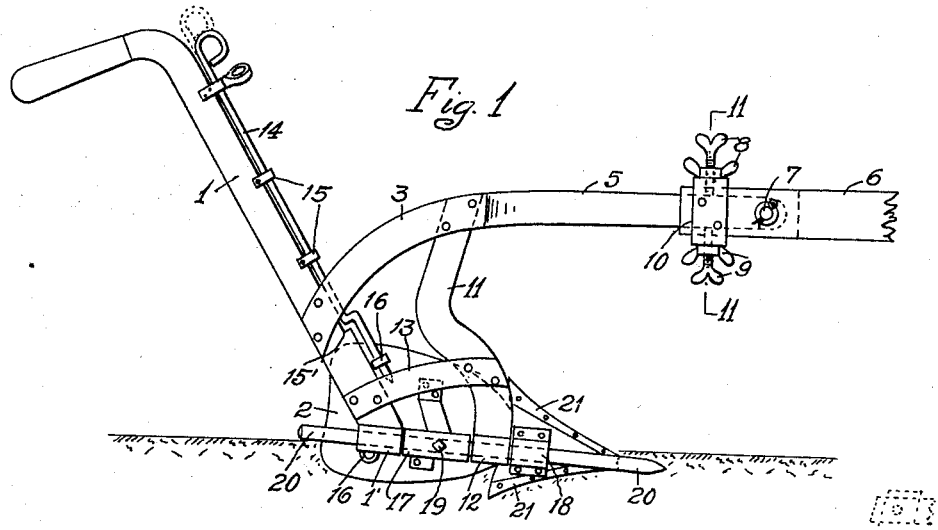
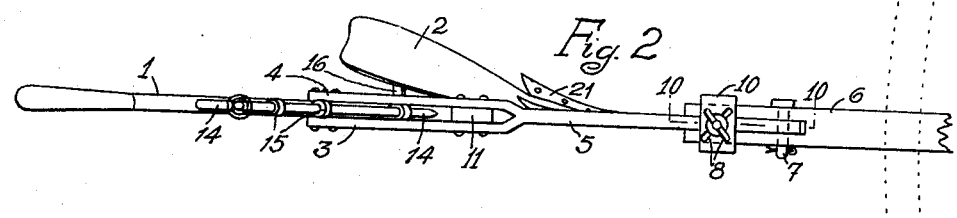
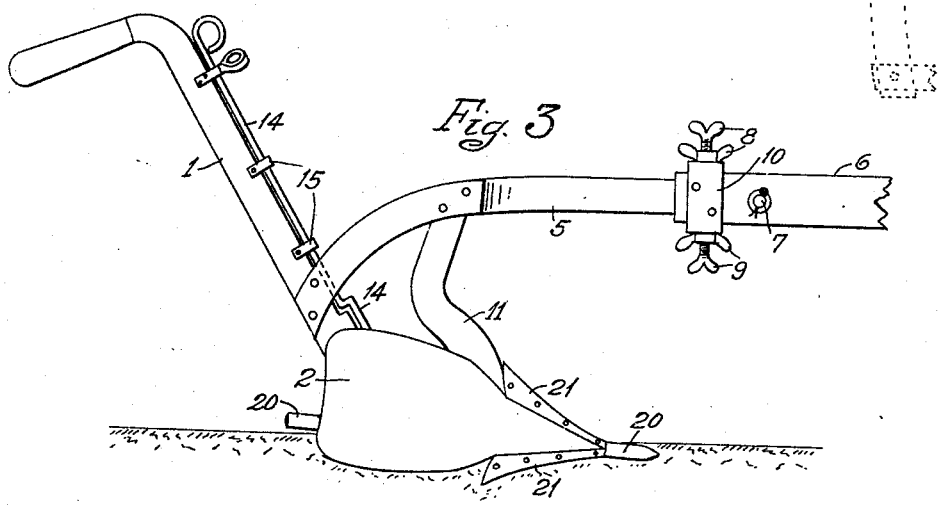

1,749,277

UNITED STATES PATENT OFFICE

PEDRO CARBONELL FIGUERAS, OF HABANA, CUBA

PLOW

Application filed March 17, 1928, Serial No. 262,416, and in Cuba March 1, 1928.

This invention relates to improvements in plows used for breaking up the ground to prepare it for cultivation.

The object of the invention is to provide a plow which is simple in construction and one easily operated.

A further object of the invention is to provide a plow with a pivotally mounted share, supported on a shaft to permit of said share being turned from one side to the other.

In the drawings:

Fig. 1 is a side elevation of the plow showing the share from its furrow side.

Fig. 2 is a plan view.

Fig. 3 is a side elevation of the plow showing the share in the position opposite to that shown in Fig. 1.

Fig. 4 is a rear elevation of the plow showing the share in one position.

Fig. 5 is a similar view with the share in the opposite position.

Fig. 6 is a detail view of the structure which supports the share.

Fig. 7 is a front elevation of the share.

Fig. 8 is a rear elevation of the same.

Fig. 9 is a view of the shaft on which the share is mounted.

Fig. 10 is a detail sectional view on the line 10—10 of Fig. 2.

Fig. 11 is a detail sectional view on the line 11—11 of Fig. 1.

In the annexed drawings, in which the same reference numbers indicate similar parts in the various figures, 1 indicates a plow handle provided at its lower end with a bearing 1'. The numeral 5 indicates a plow beam, the rear end of which is forked and extended downwardly to provide plates 3 and 4, the ends of which are fastened to the handle 1. Secured to the outer end of the plow beam by bolt 7, is a draft bar, the latter being adjustable through the medium of screws and nuts 8 and 9 mounted in bracket 10. Secured between the forward portion of the plates 3 and 4 is a depending standard 11 terminating at its lower end in a bearing 12, and extending between and secured to the standard 11 and the handle 1, there are two braces 13, one on each side which reinforce the structure. On the front of the handle 1 is mounted a rod 14, slidable in guides 15, the rod having a shoulder which cooperates with a flange 15' on the handle which provides means for limiting the movement of the rod in one direction.

The plow share 2, as illustrated in Figs. 7 and 8, is provided on its inner side with two eyes 16 with which the rod 14 cooperates, and at or about the center and towards the front of the under side of the share are bearings 17 and 18, bearing 17 having a set-screw 19. Blades 21 are secured on each side of the front part of the share, and are removably connected by means of screws 22 so as to enable them to be replaced when required.

A shaft 20 extends through the bearings 1', 17, 12 and 18, and by tightening the set-screw 19, the share is set in fixed position. The forward end of the shaft extends beyond the front end of the plow share to provide a point to penetrate the ground when the plow is in use.

The operation is as follows: Assuming the plow share to be in the position indicated in Fig. 1, to place said share in the opposite position or that shown in Fig. 3, the rod 14 is raised so as to disconnect it from eye 16, and then the share is turned upon shaft 20. Then by pushing down the rod 14, and inserting the end thereof in the opposite eye 16 and tightening screw 19, the share is fixed and ready for operation.

If it is desired to lower the cutting depth of the share, the screw 9 is loosened and the nut and screw 8 correspondingly tightened, and when it is desired to raise the share the operation is reversed, that is screw 8 is loosened and screw 9 correspondingly tightened.

Having thus described my invention, what I claim is:

A plow comprising a handle, a plow beam forked and curved downwardly at its rear end, a bearing formed at the lower end of the handle, a standard secured at the juncture of the forks and the beam, a bearing formed at the lower end of said standard, said bearing being in line with the bearing on the handle but spaced therefrom, a reinforcing brace connecting the handle and the standard, a plowshare, spaced bearings secured thereto, said latter bearings each being adapted to be positioned respectively in advance of the bearings on the handle and on the standard, a shaft passing through all the bearings to rotatably support the plowshare, a locking bolt carried by and movable with respect to the handle, and means on the plowshare with which the locking bolt may cooperate to secure the plowshare in either right or left position with respect to the handle.

In witness whereof I affix my signature.

PEDRO CARBONELL FIGUERAS.